United States Patent [19]

Cheng

[11] Patent Number: 4,732,441
[45] Date of Patent: Mar. 22, 1988

[54] ORIENTED-REFLECTION REFLECTIVE MIRROR SCREEN

[76] Inventor: Teh-Yao Cheng, No. 136, Li Hsing Road, Kaohsiung City, Taiwan

[21] Appl. No.: 49,506

[22] Filed: May 14, 1987

[51] Int. Cl.$^4$ .................... G03B 21/56; G03B 21/60
[52] U.S. Cl. .................................... 350/125; 350/129
[58] Field of Search .................... 350/117, 125, 129

[56] References Cited

U.S. PATENT DOCUMENTS

| | | | |
|---|---|---|---|
| 1,885,208 | 11/1932 | Koeppe | 350/129 |
| 3,622,223 | 11/1971 | Brakell | 350/125 |
| 3,712,708 | 1/1973 | Brown | 350/129 |
| 4,040,717 | 8/1977 | Cinque et al. | 350/129 X |
| 4,232,939 | 11/1980 | Kikuchi | 350/129 |
| 4,235,513 | 11/1980 | Vlahos | 350/129 |
| 4,291,001 | 10/1981 | Antes et al. | 350/129 |

Primary Examiner—Richard A. Wintercorn
Attorney, Agent, or Firm—Morton J. Rosenberg

[57] ABSTRACT

A reflective mirror screen for reflecting light projected from a CRT through a convex lens or from other projectors to only a specific observing area comprising a plurality of strips with parabolic surface or paraboloids. The principal axis of each parabolic surface or paraboloic is directed to the specific area located frontward of the reflective mirror screen so as to reflect the light projected thereon to the predetermined observing area. Any light projecting on the oriented-reflection reflective mirror screen will not be reflected to the specific observing area if the light does not come from the visual images projector or its adjacent area. Then, the people in the observing area will feel brighter image and relative little light interference than from conventional screens.

12 Claims, 7 Drawing Figures

ORIENTED-REFLECTION REFLECTIVE MIRROR SCREEN

BACKGROUND OF THE INVENTION

The present invention relates to an oriented-reflection reflective mirror screen which reflects the light projected from an image source to a specific observing area located substantially frontward of the reflective mirror screen.

Conventional reflecto-visual display screens have a considerable drawback in that their weak illumination (brightness) due to non-directional reflections lead to a dark and unclear visual effect. This is mainly due to the fact that conventional reflecto-visual display screens cannot produce an oriented-reflection. Light of images projected on the conventional display screen is unavoidably scatteredly reflected so as to cause the visual images on the screen to be relatively dark. Therefore, video programs can only be played in a significantly dark room. If an oriented-reflective mirror screen were made available, the relative brightness would be remarkably increased and the influence of other stray light sources would be significantly diminished.

SUMMARY OF THE INVENTION

The primary objective of this invention is therefore to provide a reflective mirror screen which obviates and mitigates the afore-described drawbacks of conventional reflecto-visual display screens.

Another objective of this invention is to provide a reflective mirror screen whose reflective surface is corrugated so as to reflect the visual images projected from a source to a specific observing area with comparatively high illumination and to decrease the reflection from stray light sources.

Other objectives and advantages of this invention will become more apparent from a study of the following description taken with the accompanying drawings.

BRIEF DESCRIPTION OF THE DRAWINGS

FIG. 7 is a perspective view of the oriented-reflection reflective mirror screen illustrating the use thereof together with a CRT (cathode-ray tube) and a convex lens.

DETAILED DESCRIPTION OF THE PREFERRED EMBODIMENTS

Figure 1:
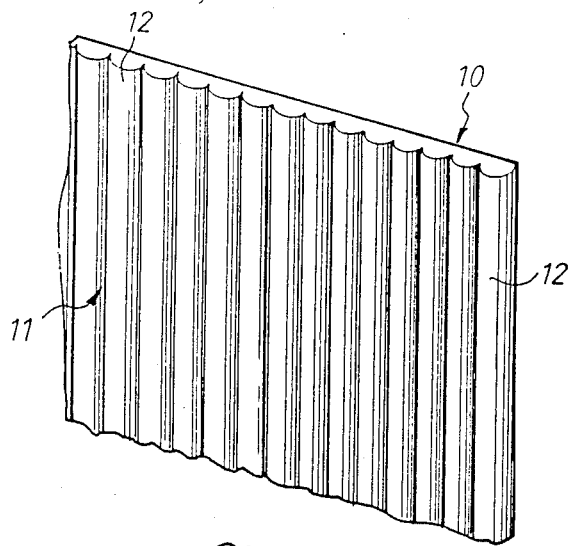
FIG. 1 is a perspective view of an embodiment of the oriented-reflection reflective mirror screen according to the present invention.

Referring to FIG. 1, it can be seen that the first embodiment of the oriented-reflection reflective mirror screen generally designated by the reference numeral 10 is a flat (planar) rectangular mirror with the reflective side 11 thereof being formed with a plurality of vertical convex strips 12. Each strip 12 is approximately 5 mm or less in width. These vertical strips 12 are continuously abutted along the whole width of the rectangular oriented-reflection reflective mirror screen 10. The cross-section of any individual vertical strip 12 taken perpendicularly at any point along the length of the oriented-reflection reflective mirror screen 10 is conic. Paraboloid is the preferred shape of the conic surfaces in this case. The principal axes of each of the vertical strips 12 are directed to a specific area (not shown) which is substantially located in the front of the corrugated-surface reflective mirror screen 10 such that the light projected thereon from the projector will be reflected to a specific observing area. Accordingly, the principal axes of the vertical strips 12 located around middle portion of the reflective mirror screen 10 are substantially directed straight forward. The principal axes of the vertical strips 12 located near either side of the reflective mirror screen 10 are not perpendicular to their straight front direction and are directed towards the central front area of the whole reflective mirror screen 10. Although the strips 12 of the oriented-reflection reflective mirror screen 10 have been shown in FIG. 1 as vertical, it is to be noted that the strips alternatively could be horizontal. The oriented-reflection reflective mirror screen 10 with a plurality of horizontal strips can be understood by rotating 90 degrees the corrugated-surface of the reflective mirror screen 10 as shown in FIG. 1. The curvature of each parabolic surface of the strips 12 can be adjusted to determine the location of the observing area of the oriented-reflection reflective mirror screen 10.

Figure 2:
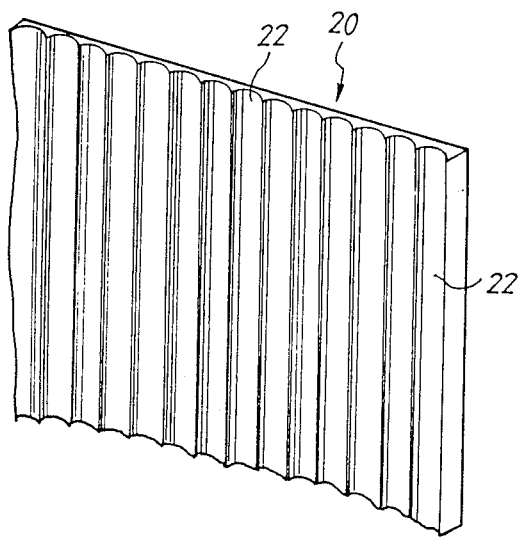
FIG. 2 is a perspective view of another embodiment of the oriented-reflection reflective mirror screen according to the present invention.

Referring to FIG. 2, another embodiment of the oriented-reflection reflective mirror screen generally designated by the reference numeral 20 is clearly seen. The oriented-reflection reflective mirror screen 20 comprises a plurality of vertical (as shown in FIG. 2) or horizontal (not shown) concave strips 22. These concave strips 22 are also continuously abutted along the whole width (height if horizontal) of the reflective mirror screen 20. The width of each concave strip 22 is approximately 5 mm or less. The cross-section of every individual vertical concave strip 22 perpendicularly taken throughout the whole height of the reflective mirror screen 20 has an identical concave conic shape and particularly is parabolic. The principal axes of all vertical concave strips 22 are directed to a specific area located substantially frontward from the oriented-reflection reflective mirror screen 20. Accordingly, the principal axes of the concave strips 22 located around middle portion of the reflective mirror screen 22 are directed straight forward while the principal axes of the concave strips 22 located near either side of the mirror screen 22 are directed toward the central front area of the whole reflective mirror screen. The curvature of each parabolic surface of the concave strips 22 can be designed to determined the location of the observing area of the oriented-reflection reflective mirror screen 20.

Figure 3:
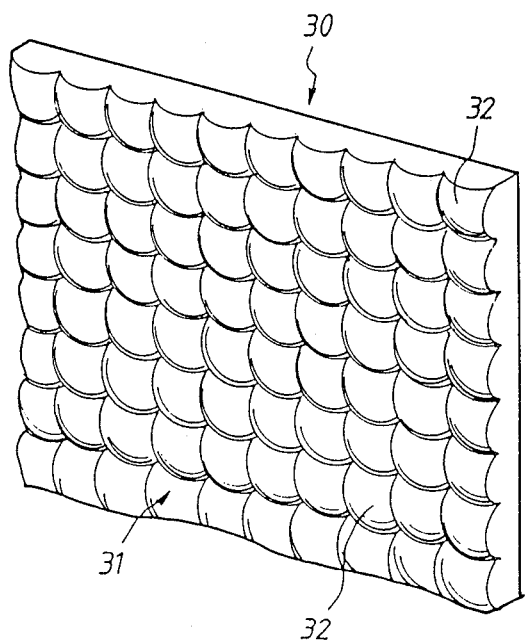
FIG. 3 is a perspective view of a further embodiment of the oriented-reflection reflective mirror screen according to the present invention.

Referring to FIG. 3, another embodiment of the oriented-reflection reflective mirror screen generally designated by the reference numeral 30 is clearly seen. Specifically speaking, this oriented-reflection reflective mirror screen 30 is a combination of the oriented-reflection reflective mirror screens 10 with vertical convex strips 12 and with horizontal convex strips. Accordingly, the reflective mirror screen 30 comprises a matrix of square grids 32 on its reflective side 31. Each grid 32 has a convex conic surface, particularly a paraboloid. The curvature and orientation of each grid 32 is arranged such that light projected thereonto will be reflected to a specific observing area located substantially frontward from the oriented-reflection reflective mirror screen 30.

It is to be noted that the square grids 32 of the oriented-reflection reflective mirror screen 30 shown in FIG. 3 can also be concave (not shown). The concave grids 32 of the oriented-reflection reflective mirror screen 30 are particularly the paraboloids. The concave paraboloids of the grids 32 of the reflective mirror screen 30 are designed so that the visual images projected thereonto are reflected to a specific observing area located substantially some feet frontward from the whole oriented-reflection reflective mirror screen 30.

As shown in FIGS. 1 to 3, all embodiments of the oriented-reflection reflective mirror screen 10, 20 and 30 are plane mirror screens although their reflective sides are corrugatd. The whole corrugated-reflective surface of the reflective mirror screen can be concavely parabolic. The characteristics of the concave paraboloid of the oriented-reflection reflective mirror screen can make the visual images projected onto each parabolic strips or grids be reflected to a specific observing area located substantially frontward from the concave parabolic reflective mirror screen.

Figure 4:
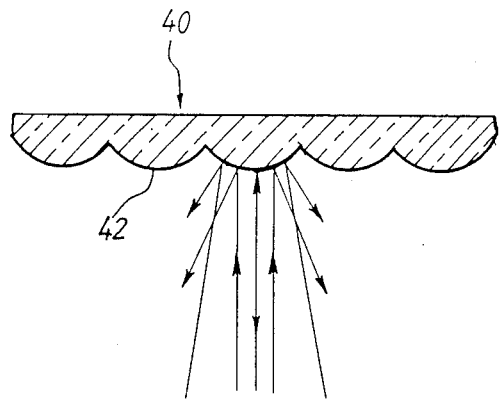
FIG. 4 is a top plan view of the oriented-reflection reflective mirror screen as shown in FIG. 1.
Figure 5:
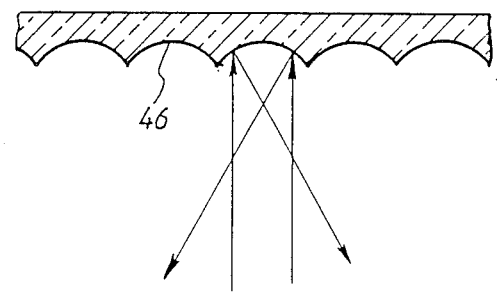
FIG. 5 is a top plan view of the oriented-reflection reflective mirror screen as shown in FIG. 2.

Referring to FIGS. 4 and 5, the reflection of the visual images projected from an images source, like a CRT, through a convex lens onto the corrugated reflective surface can be clearly seen. As seen in FIG. 4, the visual images projected onto the convex parabolic strips or grids are reflected to a specific observing area which is substantially located frontward from the reflective mirror screen 40 and 46.

Figure 6:
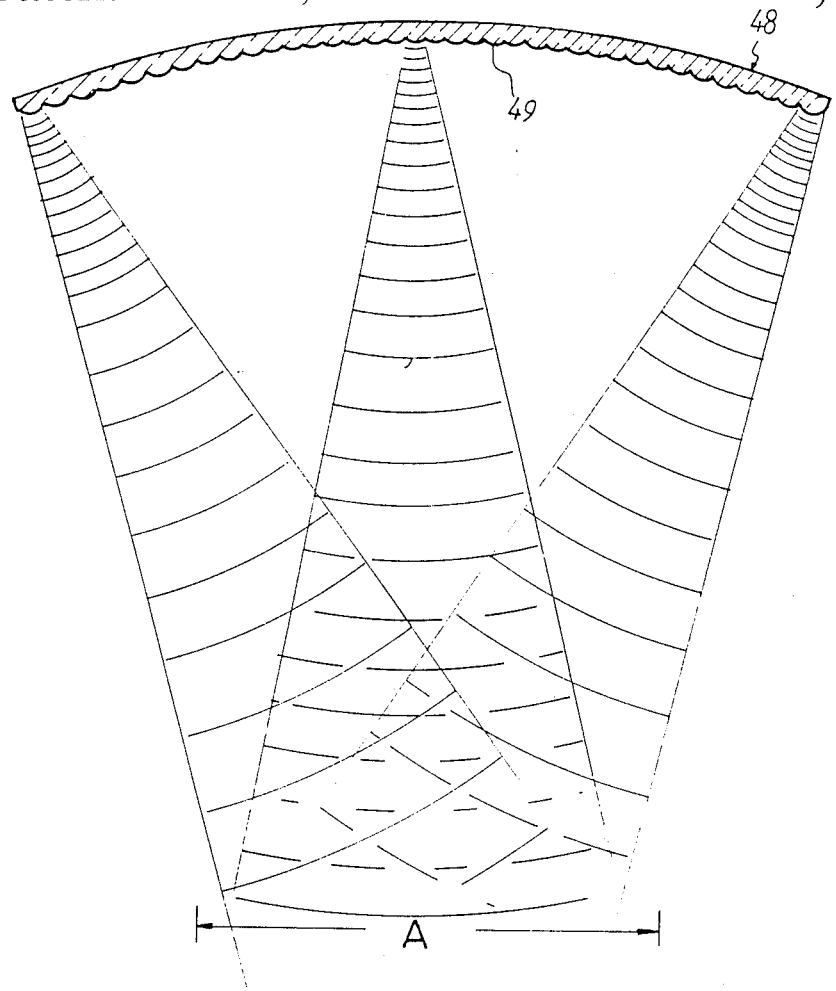
FIG. 6 is a top plan view of the oriented-reflection reflective mirror screen showing the direction of reflection.
Figure 1:
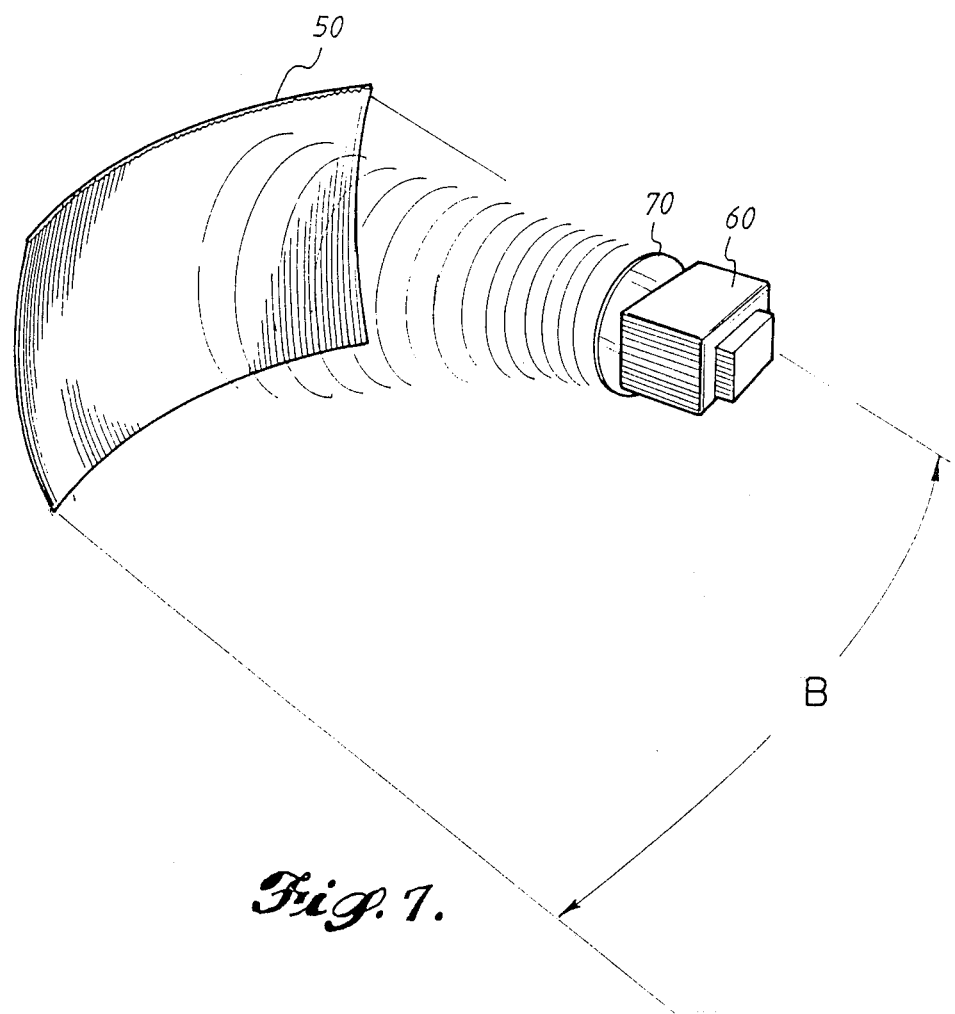

Referring to FIG. 6, it can be clearly seen that the whole light points from the image source will be reflected to area A. Thus, every points on the mirror screen 48 would be seen as an observer locates at the area A.

Referring to FIG. 7, an exemplary use of the oriented-reflection reflective mirror screen 50 can be clearly seen. A images source, in this case a CRT 60 located substantially frontward and above the middle portion of the reflective mirror screen 50, projects visual images through the convex lens 70 to the oriented-reflection reflective mirror screen 50. Any light points projected onto the oriented-reflection reflective mirror screen 50 will be reflected to a specific observing area B located substantially frontward of the reflective mirror screen 50 such that very light point, i.e. the whole picture on the oriented-reflection reflective mirror screen 50, can be seen by an observer located in the specific observing area B. Since the locations of the images source, like a CRT, and the specific observing area are pre-determined in accordance with the configuration of the parabolic strips or grids, the light projecting onto the corrugated reflective surface is not be reflected to the observing area if the light does not come from the projector or its adjacent area. As the area adjacent to the CRT or other projector is shielded with suitable light-shielding material, the oriented-reflection reflective mirror screen will thus not reflect any stray light to the specific preset observing area.

It is noteworthy that although the concave or convex strips or grids of the corrugated-surface reflective mirror screen described in the above embodiments are restricted to the preferred form with parabolic surfaces or paraboloids, the surfaces of the convex or concave strips or grids of the oriented-reflection reflective mirror screen according to the present invention can be any appropriate conic surfaces. The part of the parabolic structure may be replaced by a part from a circle for the convenience of the manufacturing. The parabolic structure is preferred as it provides a more even reflection effect than other structures do.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. An oriented-reflection reflective mirror screen for reflecting visual images projected from preset images to a specific observing area, comprising a reflective surface provided with a plurality of vertical or horizontal abutted strips having conic surfaces which are formed so as to reflect visual images projected thereon to said specific observing area which is located substantially frontward from the reflective mirror screen.

2. The oriented-reflection reflective mirror screen of claim 1, wherein said conic surfaces are parabolic.

3. The oriented-reflection reflective mirror screen of claim 1, wherein said reflective mirror screen is planar.

4. The oriented-reflection reflective mirror screen of claim 1, wherein said reflective mirror screen is concave.

5. The oriented-reflection reflective mirror screen of claim 2, wherein said parabolic surfaces are convex.

6. The oriented-reflection reflective mirror screen of claim 2, wherein said parabolic surfaces are concave.

7. An oriented-reflection reflective mirror screen for reflecting visual images projected from preset images to a specific observing area, comprising a reflective surface provided with a matric of a plurality of square grids, the surface of each square grid being a conic surface and said conic surface being formed so as to reflect visual images projected thereon to said specific observing area located substantially frontward from said oriented-reflection reflective mirror screen.

8. The oriented-reflection reflective mirror screen of claim 7, wherein said conic surface is paraboloid.

9. The oriented-reflection reflective mirror screen of claim 7, wherein said reflective mirror screen is planar.

10. The oriented-reflection reflective mirror screen of claim 7, wherein said reflective mirror screen is concave.

11. The oriented-reflection reflective mirror screen of claim 8, wherein the paraboloids are convex.

12. The oriented-reflection reflective mirror screen of claim 8, wherein the paraboloids are concave.

* * * * *